(12) United States Patent
Venard et al.

(10) Patent No.: US 6,357,070 B1
(45) Date of Patent: Mar. 19, 2002

(54) MULTI-FUNCTION, BATTERY-POWERED, RIDER CLEANING MACHINE

(75) Inventors: Daniel C. Venard, Littleton, CO (US); Christopher M. Knowlton, Pinehurst, NC (US); Robert J. O'Hara, Castle Rock, CO (US)

(73) Assignee: Windsor Industries, Inc., Englewood, CO (US)

( * ) Notice: Subject to any disclaimer, the term of this patent is extended or adjusted under 35 U.S.C. 154(b) by 0 days.

(21) Appl. No.: 09/505,484

(22) Filed: Feb. 16, 2000

(51) Int. Cl.[7] .......................... A47L 11/14; A47L 11/20; A47L 11/202
(52) U.S. Cl. .......................... 15/50.1; 15/50.3; 15/320; 15/340.4; 180/68.5
(58) Field of Search .......................... 15/50.1, 50.3, 15/52.1, 78, 82–87, 320, 340.1, 340.3, 340.4; 180/65.1, 65.3, 68.5

(56) References Cited

U.S. PATENT DOCUMENTS

| | | | |
|---|---|---|---|
| 3,204,280 A | * | 9/1965 | Campbell |
| 3,797,600 A | * | 3/1974 | Miner |
| 3,838,745 A | * | 10/1974 | Kappel |
| 3,930,552 A | * | 1/1976 | Kunkle et al. |
| 3,942,215 A | * | 3/1976 | Olds |
| 3,983,952 A | * | 10/1976 | McKee |
| 4,120,411 A | | 10/1978 | Johnson |
| 4,633,541 A | | 1/1987 | Block |
| 4,654,918 A | | 4/1987 | Copper |
| D325,661 S | | 4/1992 | Hutchings et al. |
| 5,203,046 A | | 4/1993 | Shaw |
| 5,265,300 A | | 11/1993 | O'Hara et al. |
| 5,279,672 A | | 1/1994 | Betker et al. |
| 5,585,205 A | * | 12/1996 | Kohchi |
| 5,605,493 A | | 2/1997 | Donatelli et al. |
| 5,687,443 A | | 11/1997 | Moore |
| 5,742,975 A | | 4/1998 | Knowlton |
| 5,940,928 A | * | 8/1999 | Erko |
| 6,108,859 A | * | 8/2000 | Burgoon |

FOREIGN PATENT DOCUMENTS

| | | | |
|---|---|---|---|
| JP | 6-153320 A | * | 5/1994 |
| JP | 7-46710 A | * | 2/1995 |
| JP | 8-252203 A | * | 10/1996 |

* cited by examiner

Primary Examiner—Terrence R. Till
(74) Attorney, Agent, or Firm—Sheridan Ross P.C.

(57) ABSTRACT

A cleaning machine that can simultaneously perform the cleaning operations of sweeping, scrubbing and burnishing is provided. The cleaning machine is battery-operated and is driven by a riding operator. A pivotal door is located at the rear of the cleaning machine. The burnishing assembly is pivotal with the door. Upon opening the door, access to a battery pack and a cart that supports the battery pack is available. The battery pack can be removed from the cleaning machine at its rear using the cart. A charged battery pack with cart is then positioned in the battery storage assembly of the cleaning machine to replace the removed battery pack and cart. A pair of ramp members facilitate desired placement of the cart and battery pack within the cleaning machine.

26 Claims, 13 Drawing Sheets

MULTI-FUNCTION, BATTERY-POWERED, RIDER CLEANING MACHINE

FIELD OF THE INVENTION

The present invention relates to cleaning apparatuses and, in particular, to machines used to sweep, scrub and burnish a floor.

BACKGROUND OF THE INVENTION

Industrial floor cleaners are used in many applications involving large surface areas of flooring which need to be cleaned. For example, warehouses, factories, hangers, convention centers, hospitals, supermarkets and department stores all have large surface areas which need to be cleaned. Additionally, the time in which to perform this cleaning is often limited. In order to properly clean this type of flooring, it is often necessary to separately sweep the floor, scrub the floor, and then burnish the floor.

Current industrial floor cleaners used in these applications come in two types. One such cleaner is the type which can perform a single function, such as scrubbing. This type of cleaner is typically powered using a power cord that is electrically connected to an electrical outlet. This machine is usually operated by an operator who walks behind the machine. Cleaning a floor with this type of cleaner thus entails separate steps of sweeping, scrubbing, and finally burnishing the flooring surface. Separate hardware is therefore needed for this type of arrangement. Also, as noted, time constraints are often associated with these type of applications which can only be met by not performing all three cleaning functions, or by using more than one operator to perform the three functions at the same time. Moreover, since operators walk behind such a machine, operator fatigue limits the time of operation and thus the floor space which can be cleaned is limited. Another disadvantage of this type of cleaning machine is the lack of mobility that is created by running off of a power cord, as movement through aisles and around equipment is hindered by the cord.

Another type of industrial cleaner exists, wherein the operator is stationed on the cleaning vehicle itself, typically in a seat, with a steering mechanism to control the vehicle. This type of machine has the advantage of allowing larger surface areas to be cleaned in a limited amount of time and eliminating operator fatigue. Additionally, these machines are often battery powered, thereby overcoming mobility problems associated with a power cord. However, such machines may only have a single cleaning assembly and therefore do not perform all three cleaning functions simultaneously, thereby having many of the same limitations as discussed above with single component machines. One difficulty with having more than a single cleaning assembly on such a machine is the increased power consumption of the additional cleaning assembly. This additional powered assembly decreases the surface area that is able to be cleaned on a single charge of the battery. If the cleaning cannot be done with a single charge, the cleaning must be either split between more than one machine, or split into time intervals using the same machine. These type of machines overcome mobility problems associated with power cords, but do not overcome many of the problems related with time constraints due to being able to perform only one cleaning function at a time and having a limited surface area which can be cleaned between charges.

Based on the foregoing, there is a need for a multiple-function machine that is battery operated, allowing the operator to have full mobility of the machine to make efficient use of time. It would also be advantageous for such a cleaning machine to have a power source that is easily removable and replaceable, thus allowing the operator to swap power sources efficiently thereby allowing floor surfaces to be cleaned with reduced time and effort.

SUMMARY OF THE INVENTION

The present invention provides a battery powered cleaning machine for sweeping, scrubbing, and burnishing floors that is particularly well suited to applications that involve relatively large floor surfaces which need to be cleaned in relatively short periods of time.

To address the applications, a battery powered cleaning machine that has several cleaning assemblies and an operator station for accommodating a riding operator is provided by the present invention. Consequently, the present invention addresses the noted deficiencies of floor cleaning machines in such applications, i.e., the limitations on time for single function cleaning machines, limitations on mobility of cord-powered machines, and limitations on surface area for multi-function battery operated machines.

The cleaning machine of the present invention also addresses the noted applications by placing cleaning assemblies or elements in certain locations, such as on the front or rear of the vehicle. For example, in the preferred embodiment, a sweeping cleaning assembly is placed at the front of the machine, a scrubbing cleaning assembly is in the middle, and a burnisher cleaning assembly is located at the rear. Additionally, the burnisher cleaning assembly is mounted on a movable assembly which is capable of pivoting away from the rear of the machine to provide access to a battery storage assembly within the machine.

The present invention also provides a battery support assembly for carrying and holding a battery pack. The battery support assembly includes a cart having wheels thereby allowing easy movement of the battery support assembly. The battery support assembly is positionable in a battery pack storage area of the cleaning machine.

Further, in one embodiment, the battery storage assembly includes a battery storage area bounded by inner side walls and two ramps. A first ramp is adjacent to one of the two inner side walls and a second ramp is adjacent to the second one. The battery support assembly can thus be easily and quickly positioned and removed from the cleaning machine by rolling it up and down the two ramps along its side edges, with substantial portions of the battery support assembly being locatable in the battery storage area.

DETAILED DESCRIPTION

While this invention is susceptible of embodiments in many different forms, there is shown in the drawings and will herein be described in detail, preferred embodiments of the invention with the understanding that the present disclosure is to be considered as being exemplary of the principles of the invention and is not intended to limit the broad aspects of the invention to the embodiments illustrated.

Figure 1:
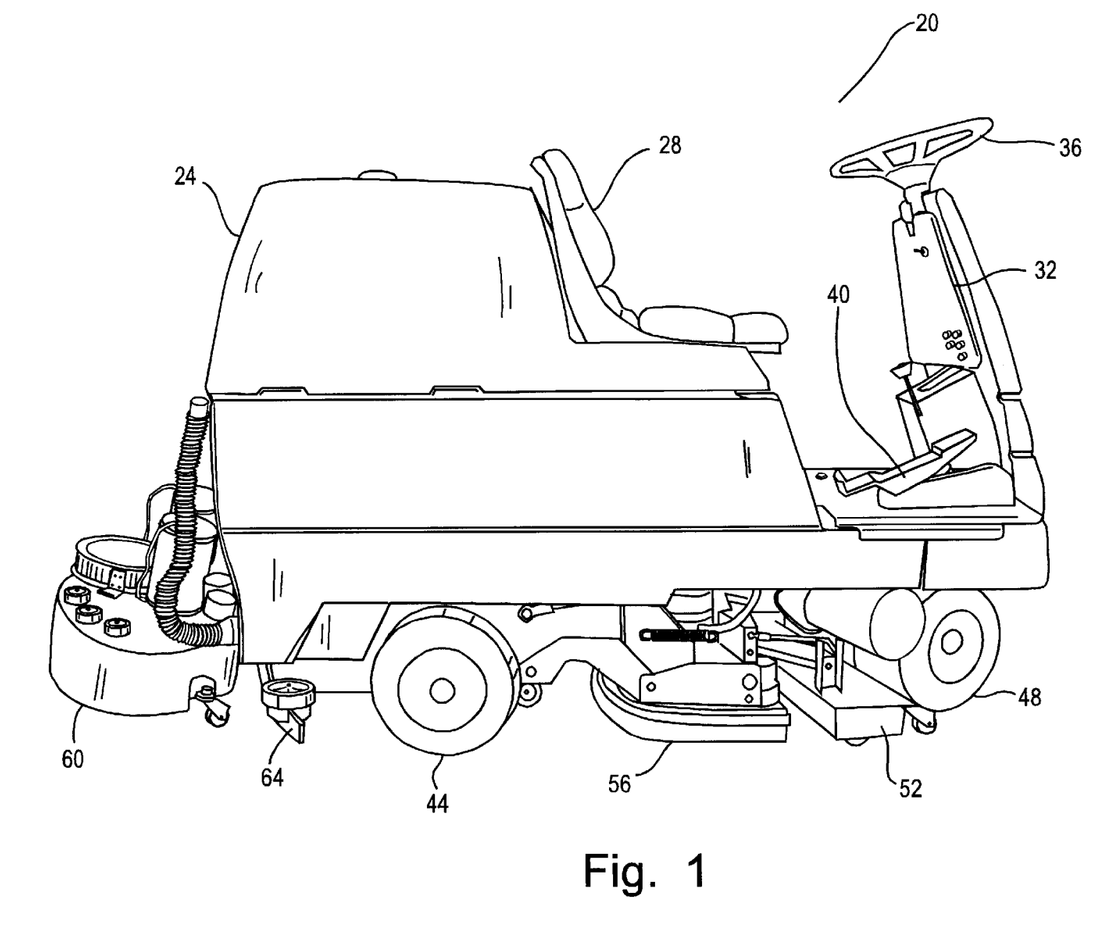
FIG. 1 is a perspective view of the cleaning machine of the present invention.

Referring to FIG. 1, a floor cleaning machine (the machine) 20 is depicted for use in cleaning relatively large floor spaces. The machine 20 is battery powered, with the battery pack contained in a battery storage area of a battery storage assembly located at the rear section of the machine 20 beneath the solution tank 24. The machine 20 has a seat 28 which accommodates an operator on the machine 20, a control panel 32, at which the operator can select the functions the machine is to perform, a steering mechanism 36, and a foot actuated accelerator/brake pedal 40. The machine rides on four wheels, two movable wheels 44 at the rear, and two drive wheels 48 mounted side-by-side at the front center of the machine.

The machine 20 employs multiple cleaning units including a sweeping assembly 52, a scrubbing assembly 56, a burnishing assembly 60 and a squeegee assembly 64. Each of these cleaning assemblies or units is capable of running simultaneously in order to facilitate rapid cleaning of the floor space. As the sweeping assembly 52, scrubbing assembly 56 and the burnishing assembly 60 each run off of electric power, there is a significant drain on the battery pack or unit contained in the rear portion of the machine 20. In order to enable the large floor area to be cleaned rapidly, the machine 20 employs an easily replaceable battery pack. In one embodiment, with the machine 20 being powered including each of the sweeping, scrubbing and burnishing assemblies, at least 120, and usually at least 140, amperes of electrical current are utilized or drawn, when the machine 20 is being propelled within a range of 50%–80%, such as 65%, of its capability. As can be understood, for desired or optimum cleaning, the machine 20 is typically propelled at some percentage less than its full propelling capability and this is believed to be about 65%.

Figure 2:
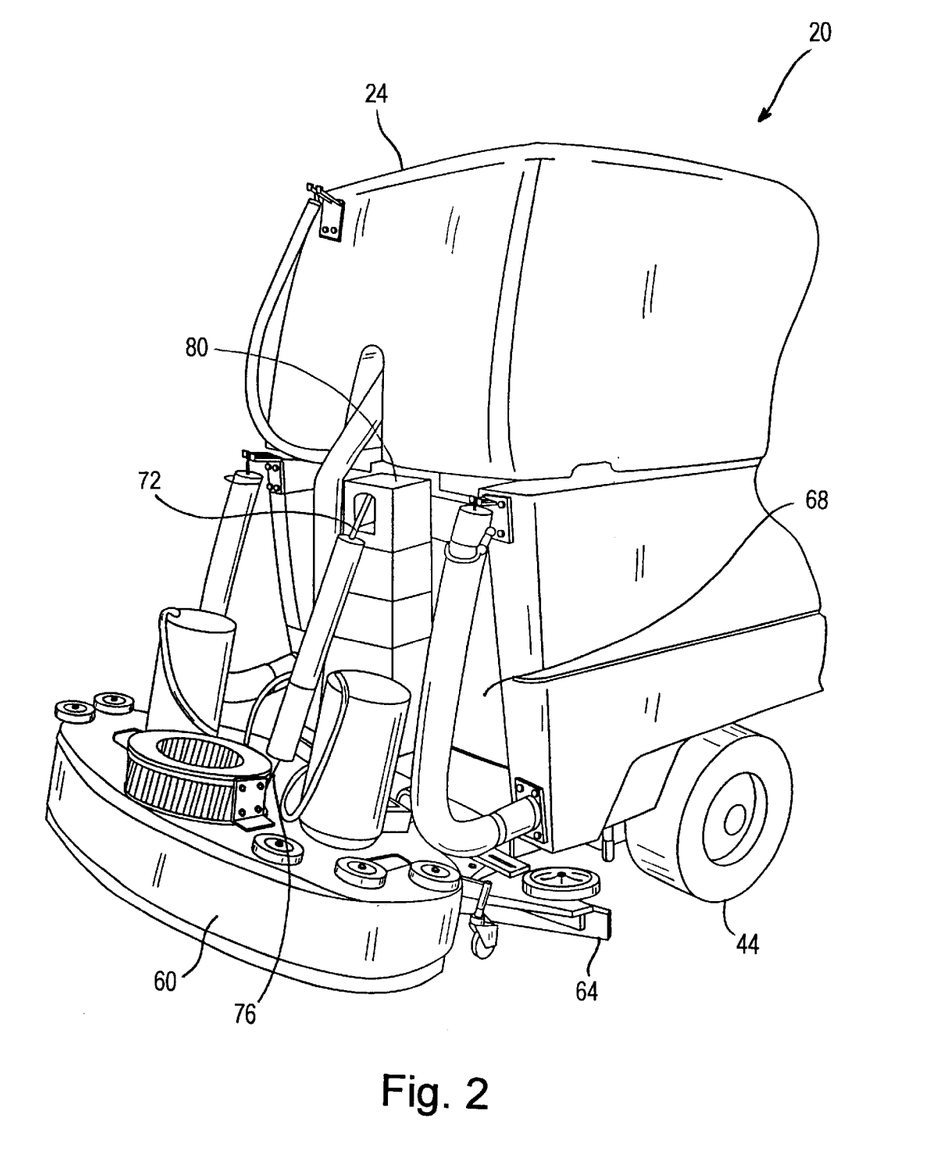
FIG. 2 is a fragmentary perspective view illustrating the rear of the cleaning machine.
Figure 3:
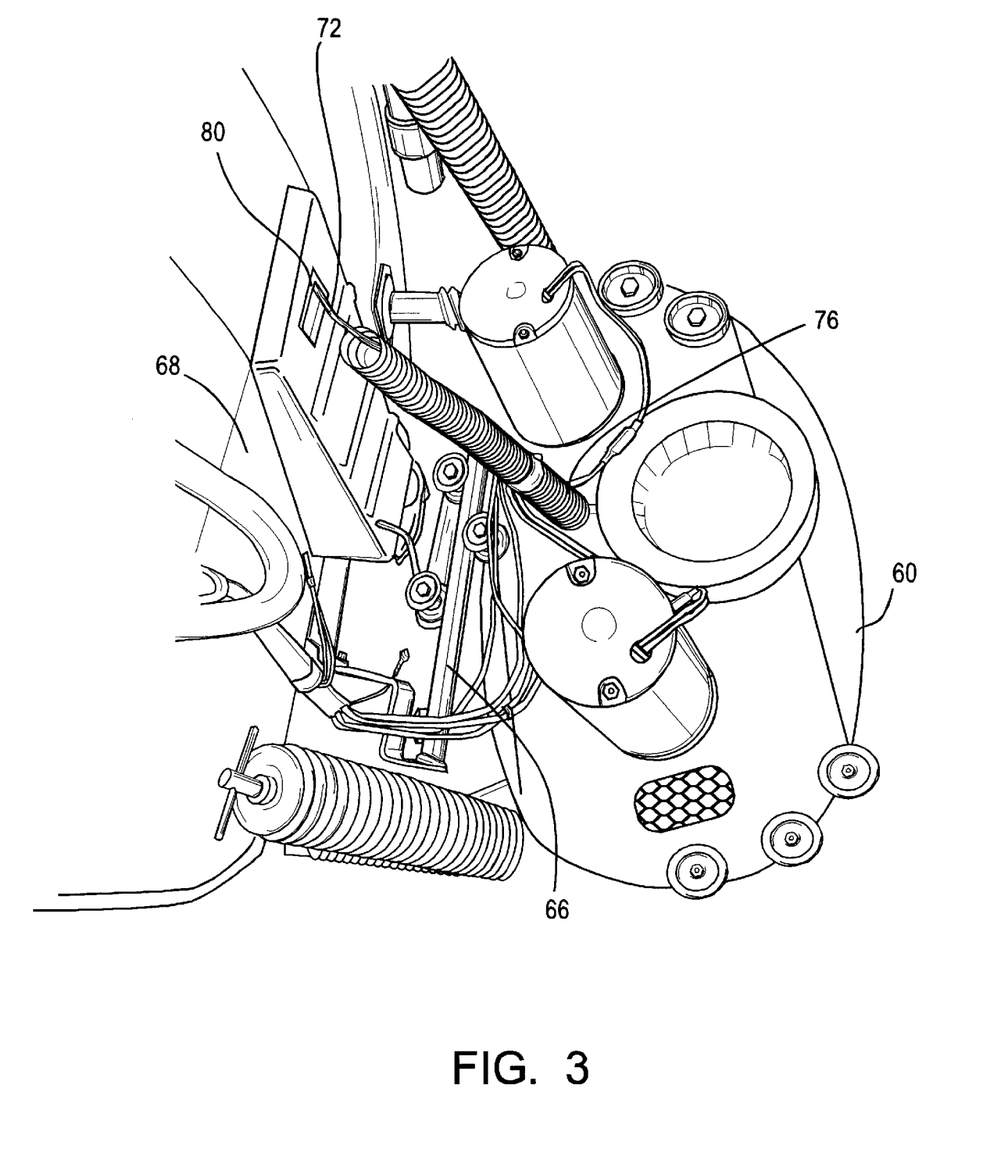
FIG. 3 is a fragmentary perspective view from the top of the burnishing assembly located at the rear of the cleaning machine.

Referring now to FIG. 2 through FIG. 8, the removal of the battery pack will now be described in detail. Referring to FIGS. 2–3, the burnishing assembly 60, located at the rear of the machine, is mounted via a pivot assembly 66 to a swing away door or panel 68. A cable 72 is attached to the burnishing assembly 60 at a point 76 away from the pivot assembly 66. The cable 72 is connected to a cable retracting mechanism 80 which is attached to the upper portion of the swing away door 68. The burnishing assembly 60 can thus be lifted off of the floor surface when the retracting mechanism 80 is actuated from the operator control panel 32. The retracting mechanism 80 consists of an electric motor(not shown) connected to the cable 72, which serves to retract the cable. As the cable 72 is retracted, the burnishing assembly 60 pivots around the pivot assembly 66 and off of the floor surface.

Figure 4:
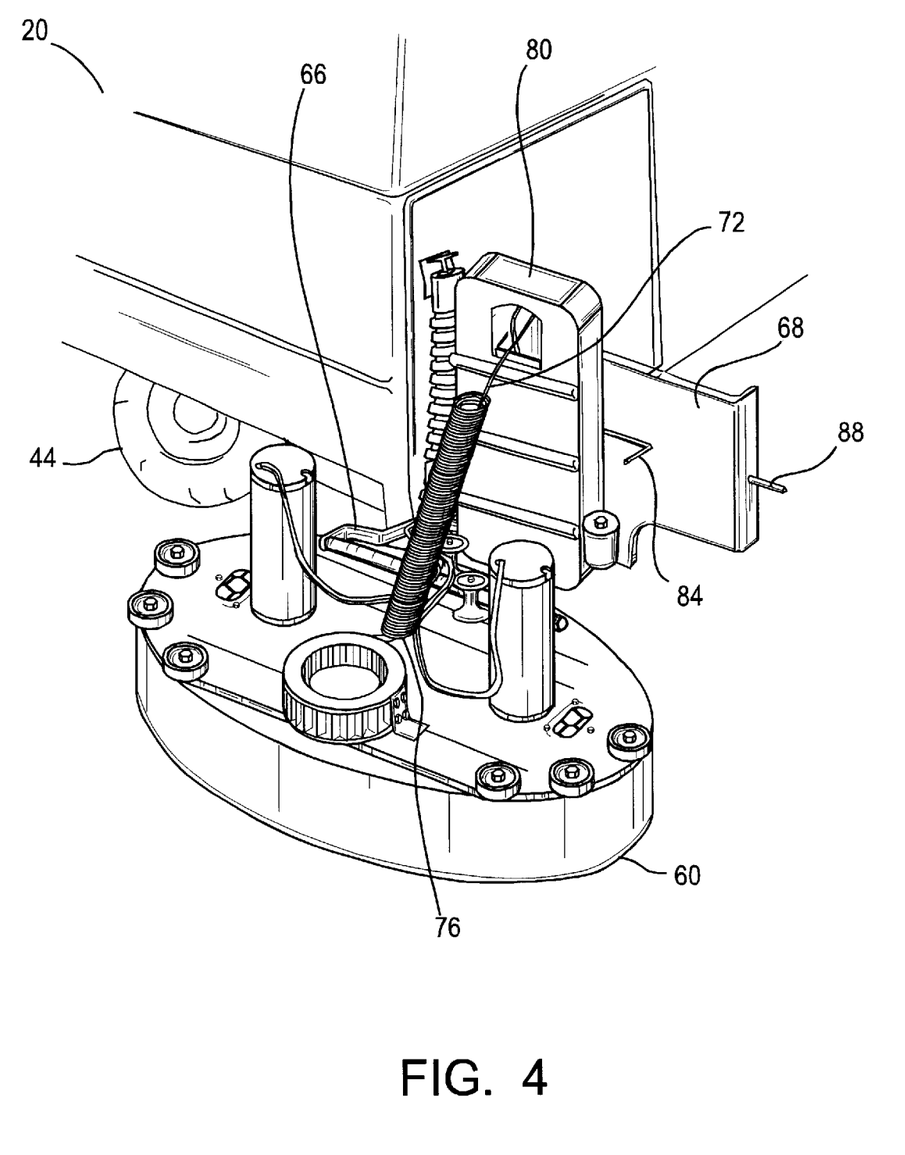
FIG. 4 is a fragmentary perspective view illustrating the open door at the rear of the cleaning machine and with the pivotal burnishing assembly pivoted away from the rear of the cleaning machine.
Figure 5:
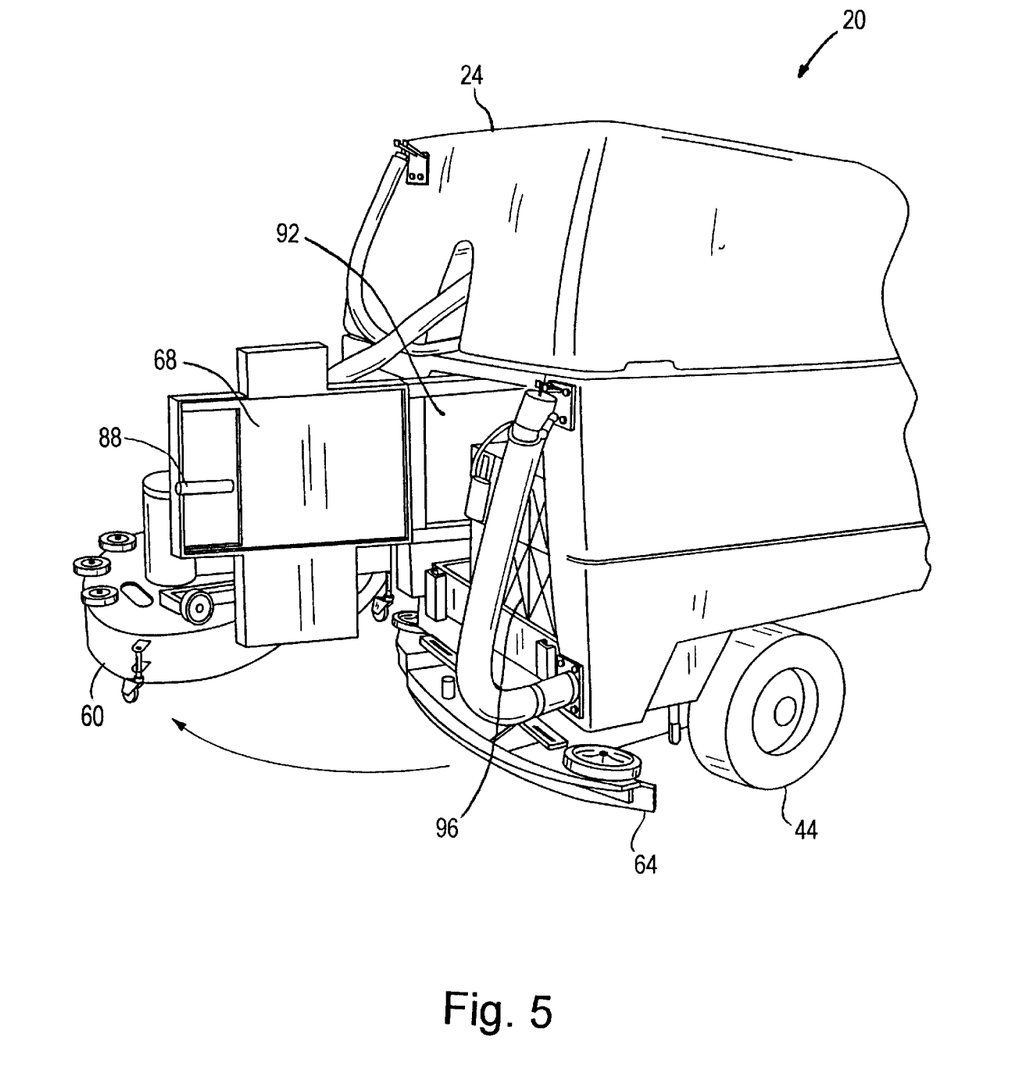
FIG. 5 is a fragmentary perspective view of the rear of the cleaning machine with the door pivoted away from the rear and illustrating an opposite side from that illustrated in FIG. 4.

Referring now to FIGS. 4–5, with the burnishing assembly 60 lifted from the floor surface, the swing away door 68 can be opened. The swing away door 68 has a latch release handle 84, which, when pulled, releases a latch bolt 88 which holds the swing away door 68 closed. The swing away door 68 provides access to the battery storage area 92 and the battery support assembly 96 contained therein.

Figure 6:
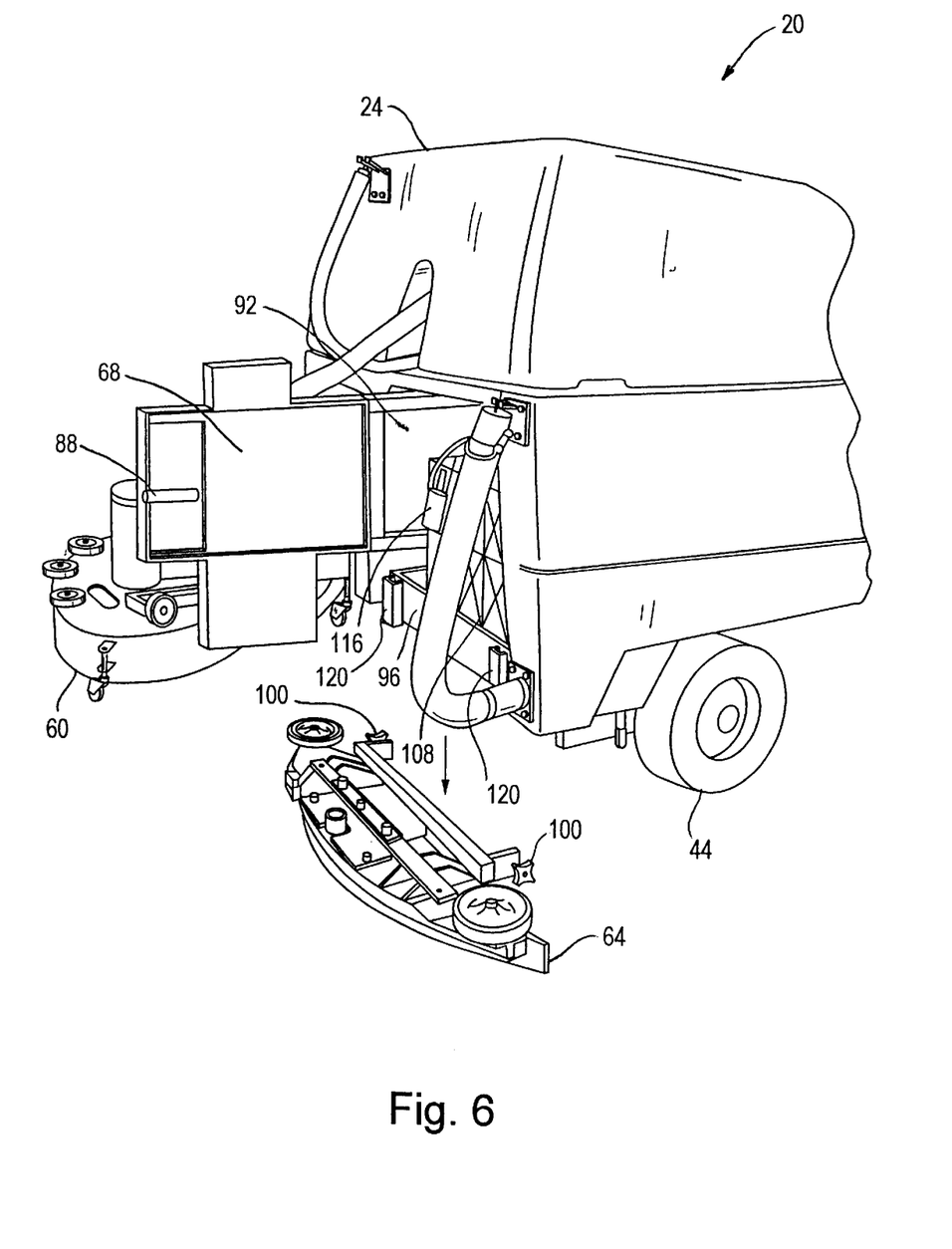
FIG. 6 is a fragmentary perspective view illustrating removal of the squeegee assembly before pivotal movement of the door at the rear of the cleaning machine.
Figure 7:
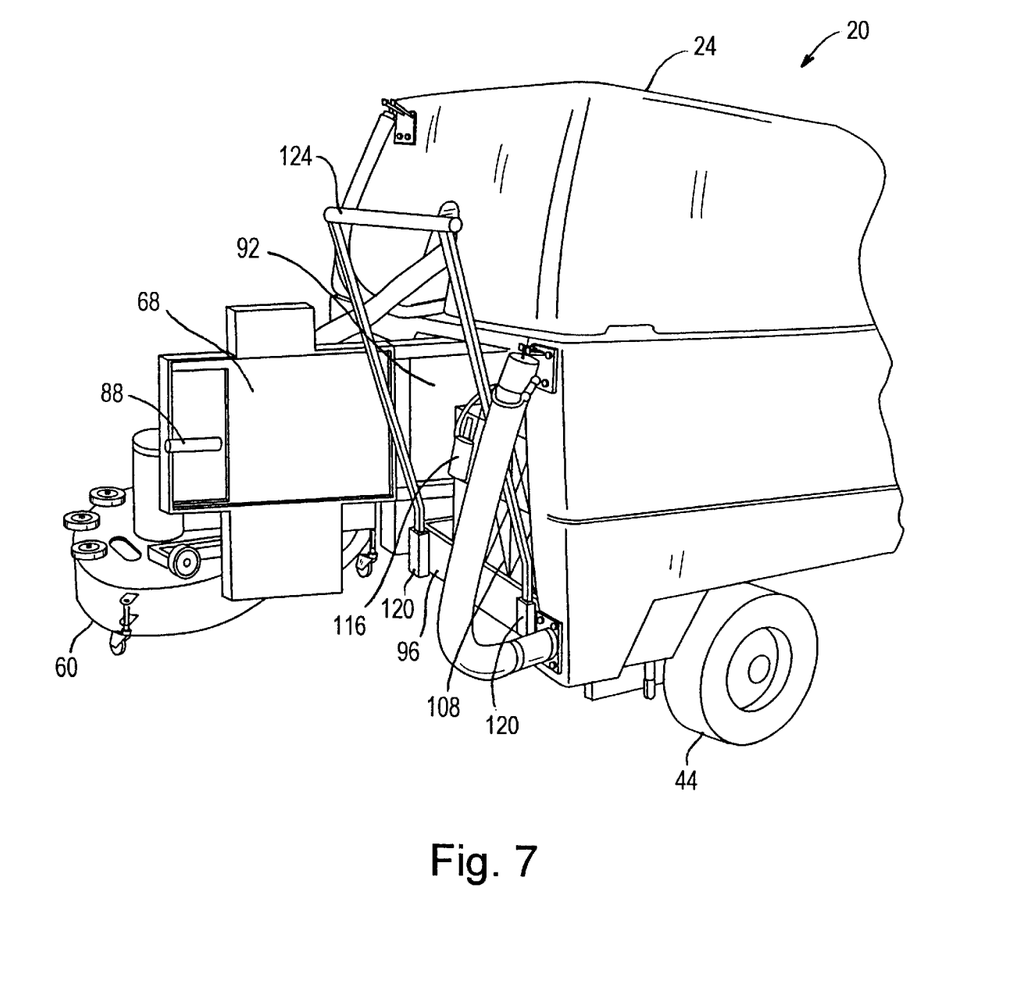
FIG. 7 is a fragmentary perspective view of the rear of the cleaning machine with the handle attached to the cart for removal of the battery support assembly from the battery storage area of the cleaning machine.
Figure 8:
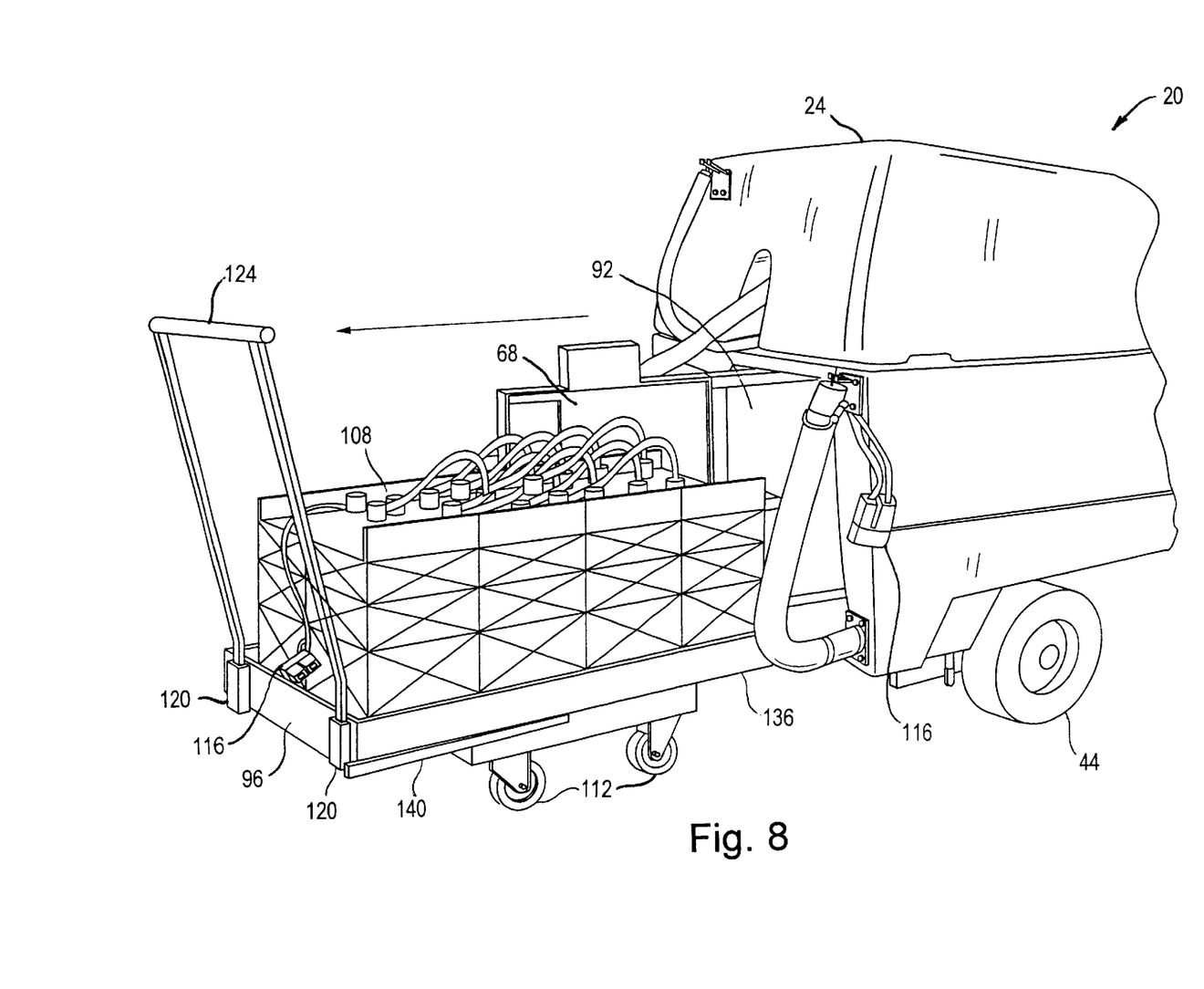
FIG. 8 is a fragmentary perspective view of the rear of the cleaning machine illustrating removal of the battery pack.
Figure 9A:
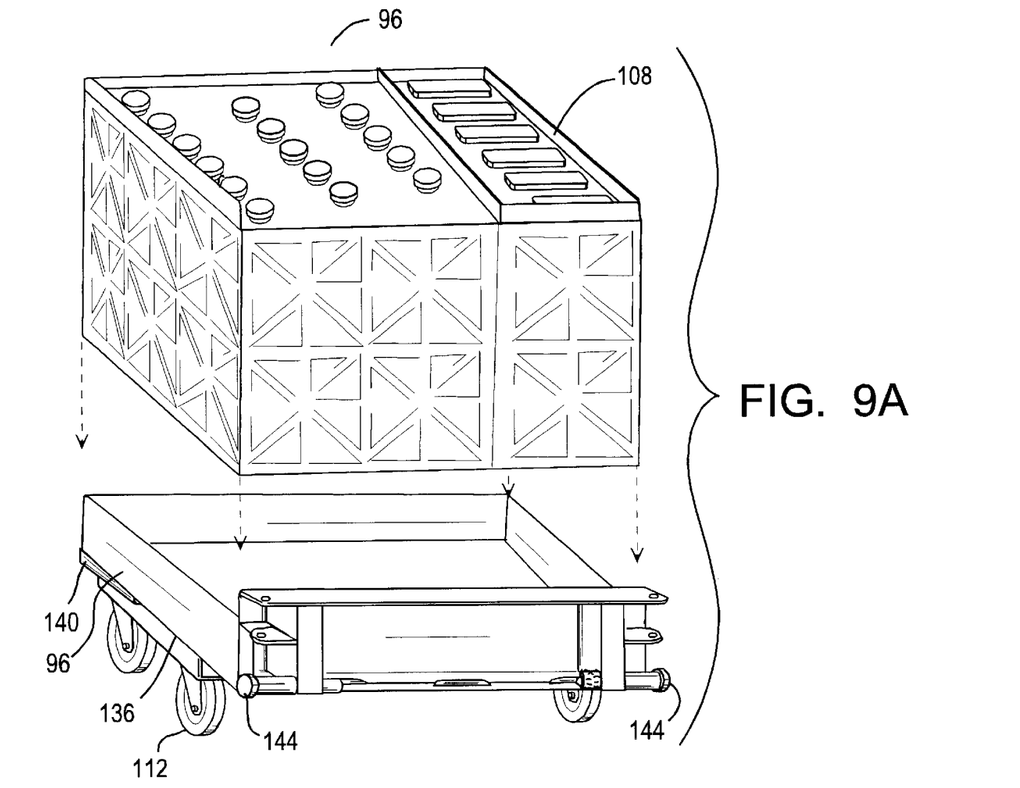
FIG. 9A is an exploded view illustrating the battery cart and the battery pack positionable in the cart.
Figure 9B:
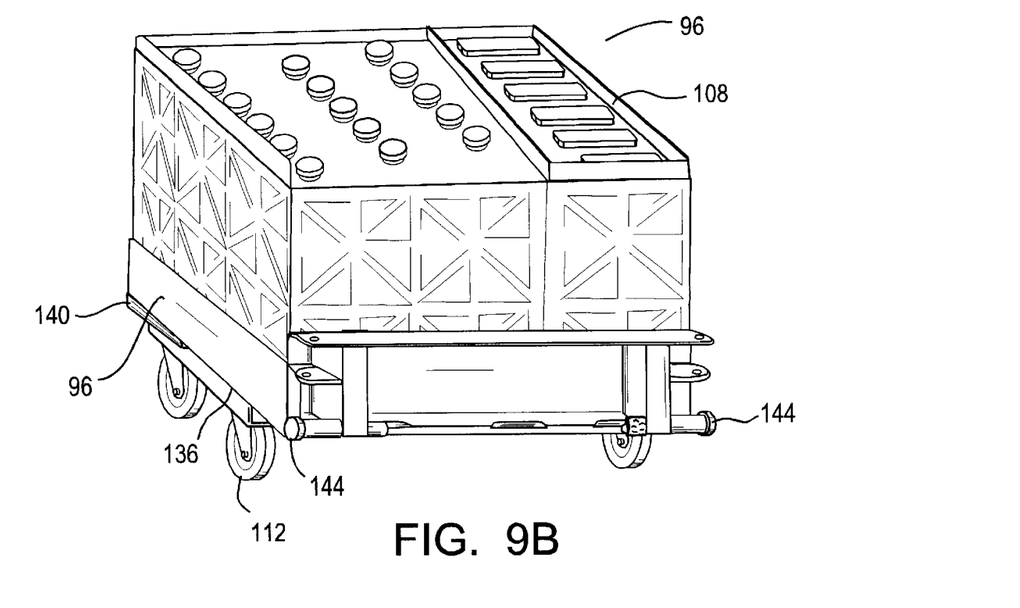
FIG. 9B is a perspective view of the battery support assembly including the battery pack supported by the cart.

Referring now to FIGS. 6–9, in one embodiment the squeegee assembly 64 is removable by loosening the turnable handles 100 located on the squeegee assembly 64. When the turnable handles 100 are loosened, the squeegee assembly 64 can be removed from the squeegee support assembly 104 (shown in FIG. 10). The battery support assembly 96, as shown in FIGS. 9A–9B, holds the battery pack 108, and has wheels 112 which allow the battery support assembly 96 and battery pack 108 to be moved with relative ease. As shown in FIG. 6, the battery pack 108 is electrically connected to the machine 20 by an electrical connector 116. The electrical connector 116 consists of a plug, which can be disconnected and reconnected by hand. The battery support assembly 96 has handle connection slots 120 in which a removable handle 124 can be inserted, as shown in FIG. 7. The removable handle 124 is used to facilitate movement of the battery support assembly 96 out of the battery storage assembly 92, and away from the machine 20, as shown in FIG. 8. A different battery pack with a full charge can then be inserted into the battery storage assembly 92 of the machine 20, and its handle 124 removed. The electrical connection 116 can then be reconnected and the squeegee assembly 64 re-attached to the squeegee support assembly 104. The swing away door 68 can be closed and latched, and cleaning can be continued.

Figure 10:
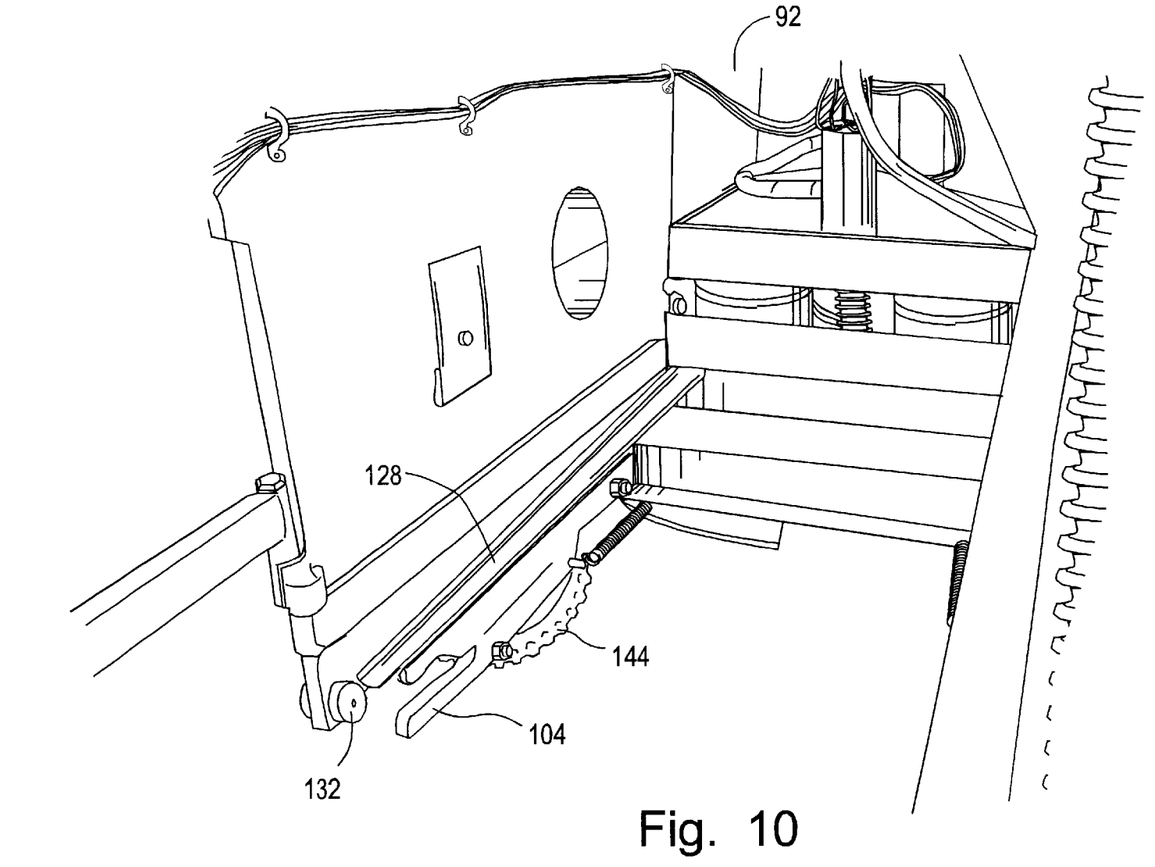
FIG. 10 is a fragmentary perspective view illustrating the battery storage assembly for receiving the battery pack and cart.
Figure 11A:
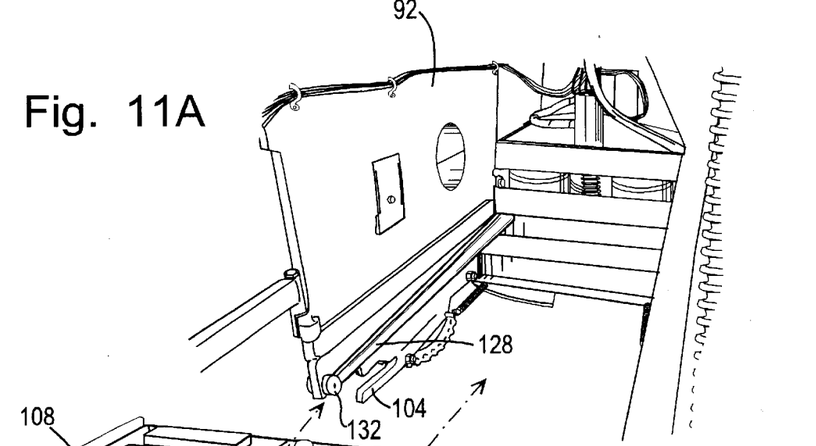
FIG. 11A is a fragmentary, perspective view of the battery storage assembly about to receive the battery pack with battery support assembly.
Figure 11B:
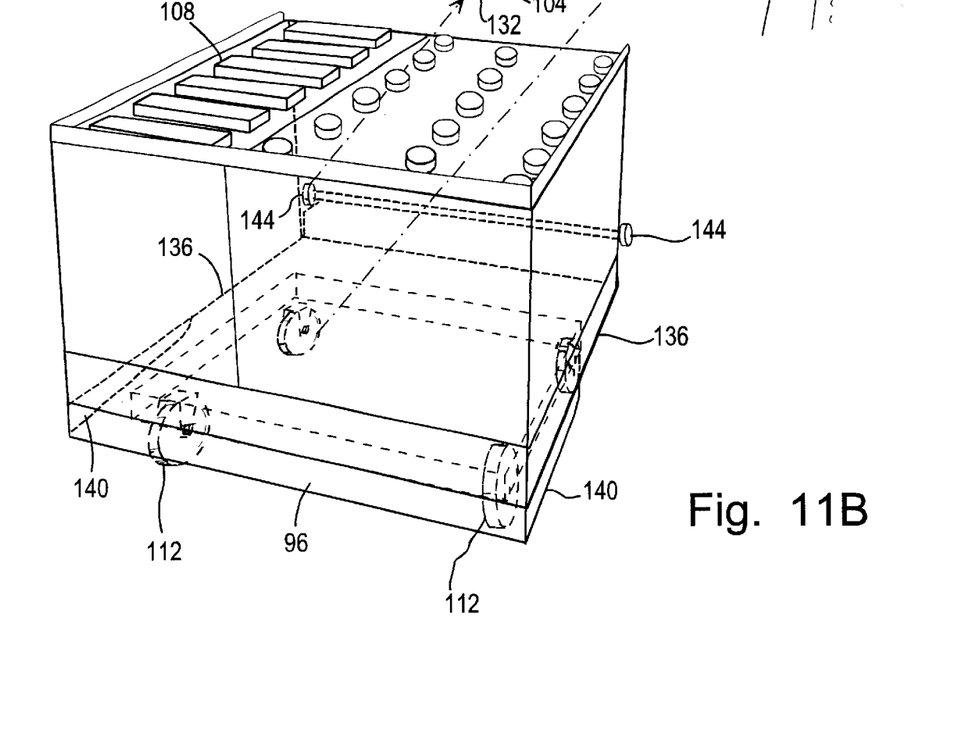
FIG. 11B illustrates the battery support assembly about to be located in the battery storage area of the cleaning machine.
Figure 11C:
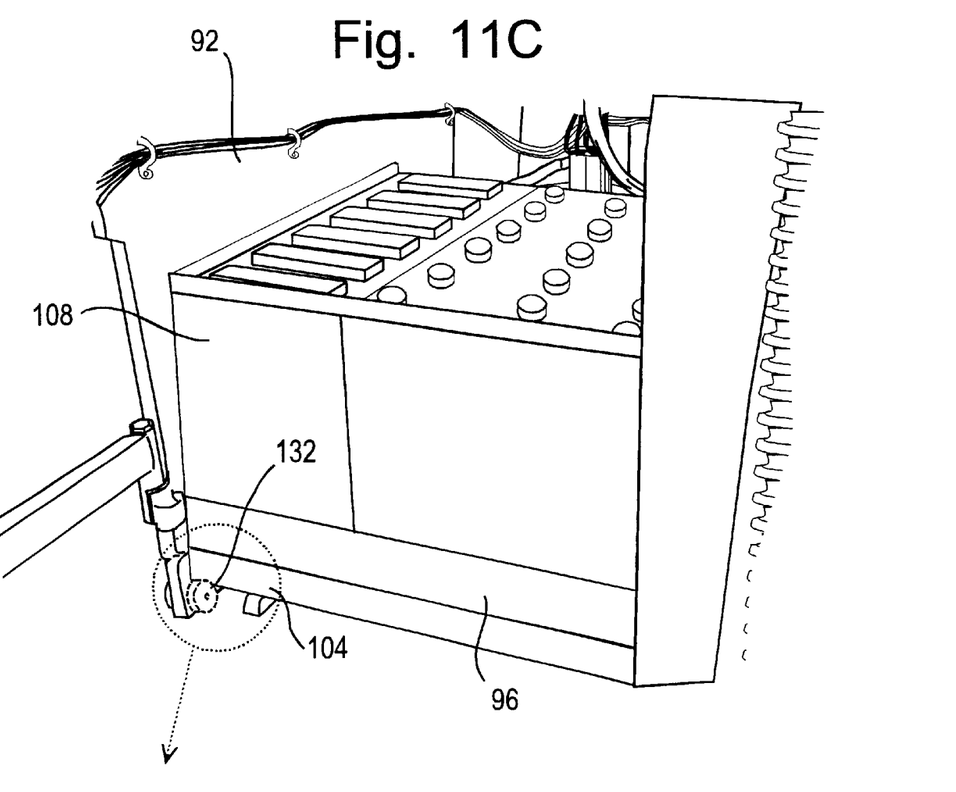
FIG. 11C illustrates the battery pack and cart located in the battery storage area at the rear of the cleaning machine.
Figure 11D:
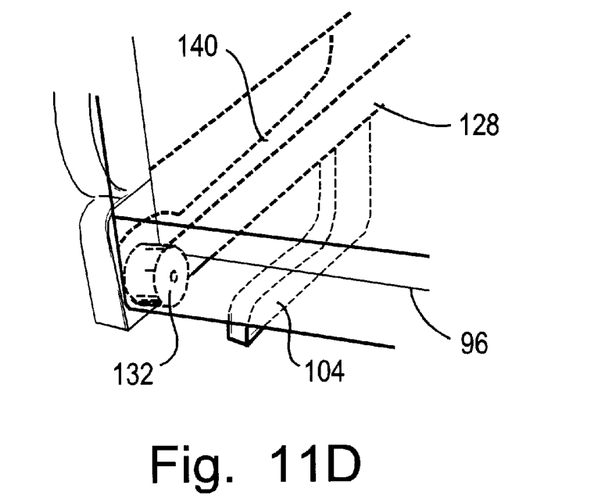
FIG. 11D is an enlarged perspective view illustrating the ramp and ramp roller that engage a rear edge of the battery cart.

At this point reference is made specifically to FIGS. 10–12 to describe a preferred embodiment for the apparatus used to support the battery support assembly 96 within the battery storage assembly 92. Within the battery storage assembly 92, there are two ramps 128, one along each side or inner wall of the battery storage assembly 92. The end of each ramp 128 has a ramp roller 132. Each side of the battery support assembly 96 has one lower rail 140 and one upper rail 136, as shown in FIG. 11A and 11B. The front of the battery support assembly 96 also has a rail roller 144 attached to the battery support assembly 96 at the front of each upper rail 136. The rail rollers 144 engage with the ramps 128 within the battery storage assembly 92.

Figure 12A:
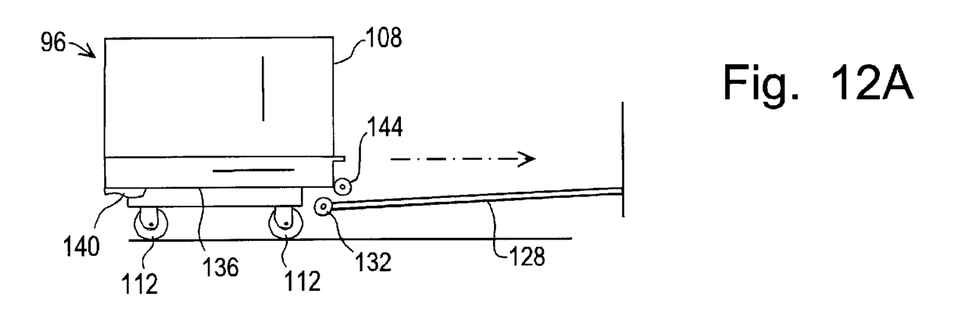
FIGS. 12A–12D diagrammatically illustrate the steps for locating the battery pack and battery cart in the battery storage area of the cleaning machine.
Figure 12B:
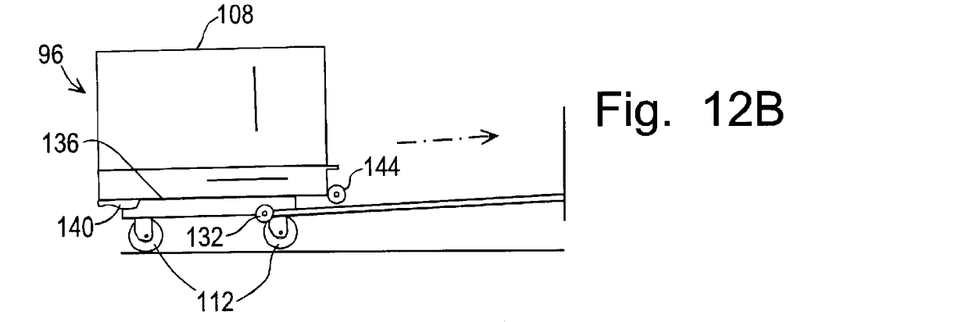
Figure 12C:
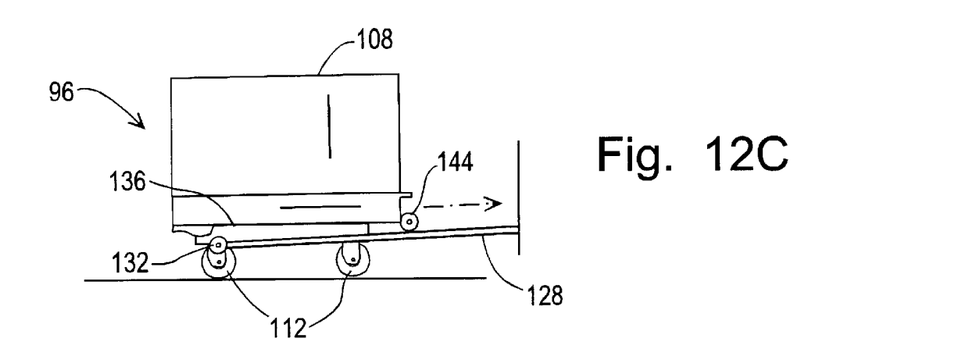
Figure 12D:
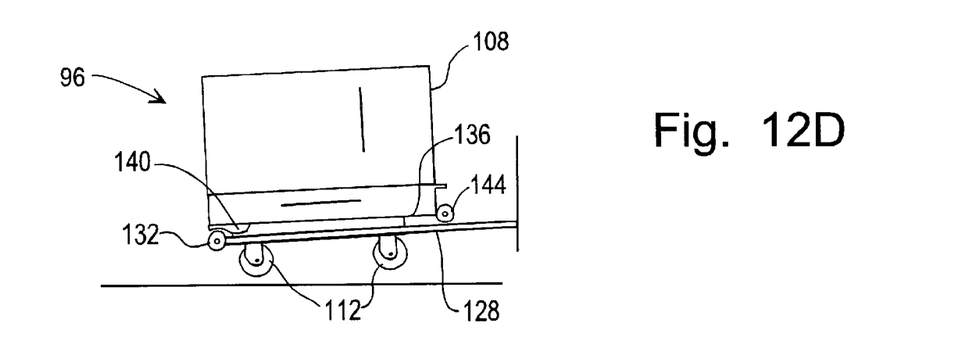

As shown in FIG. 12A, the battery support assembly 96 is designed such that as the battery support assembly 96 is moved toward the battery storage assembly 92, the front of each upper rail 136 is located above the end of each ramp 128. As the battery support assembly 96 is inserted into the battery storage assembly 92, the rail rollers 144 engage with the ramps 128, as shown in FIG. 12B. As the battery support assembly 96 is inserted further into the battery storage assembly 92, the ramp rollers 132 located within the battery storage assembly 92 engage with the lower rails 140 on the battery support assembly 96, shown in FIG. 12C. The battery support assembly 96 is then fully inserted into the battery storage assembly 92, with the battery support assembly 96 being fully supported by the ramps 128 and ramp rollers 132, as shown in FIG. 12D. The lower rails 140 are supported by the ramp rollers 132, with each ramp roller 132 fitting into a small indentation in the lower rail 140, as is shown in the detail view of FIG. 11D.

It should be understood that several options exist for the ramp embodiment described. For example, the ramp members discussed could include a bearing apparatus, that would allow the battery support assembly to be easily inserted to and removed from the battery storage assembly. Additionally, for example, the lifting mechanism for the burnishing assembly could consist of a piston type of apparatus rather than a cable and a cable retracting mechanism.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A cleaning machine, comprising:
   a housing having a front end and a rear end with battery storage therebetween;
   a sweeping assembly located closer to said front end than to said rear end;
   a scrubbing assembly located closer to said sweeping assembly than to said front end;
   a squeegee assembly;
   a burnishing assembly, said burnishing assembly being located on one side of said squeegee assembly and said scrubbing assembly being located on an opposite side of said squeegee assembly;
   a battery pack; and
   a battery support that supports said battery pack;
   wherein said battery pack and said battery support are movable to be repositioned within said battery storage and to be removed therefrom and in which each of said sweeping assembly, said scrubbing assembly and said burnishing assembly is being activated by power from said battery pack at the same time.

2. A cleaning machine, as claimed in claim 1, wherein:
   at least substantial portions of said burnishing assembly are movable relative to said housing.

3. A cleaning machine, as claimed in claim 2, wherein:
   said burnishing assembly is pivotal relative to said housing.

4. A cleaning machine, as claimed in claim 1, wherein:
   said battery support includes a battery support assembly having wheels and said battery storage includes a battery storage assembly having ramp members that are engaged by said wheels when said battery support assembly and said battery pack are moved in said battery storage assembly.

5. A cleaning machine, comprising:
   a housing assembly including a battery storage assembly;
   at least one cleaning assembly;
   a battery pack;
   a battery support assembly that supports said battery pack; and
   a squeegee assembly disposed adjacent said at least one cleaning assembly, with said squeegee assembly being removed when said battery storage assembly and said battery pack are moved from said battery storage assembly;
   wherein said battery pack and said battery support assembly are movable to be repositioned within said battery storage assembly and to be removed therefrom.

6. A cleaning machine, comprising:
   a housing assembly including a battery storage assembly;
   at least a sweeping assembly, a scrubbing assembly and a burnishing assembly that can operate at the same time in cleaning a floor over which the cleaning machine moves, said burnishing assembly including a panel located more adjacent to a rear of said housing assembly than to a front of said housing assembly for closing off said battery storage assembly; and
   a battery assembly held in said battery storage assembly that supplies electrical power to each of said sweeping, scrubbing and burnishing assemblies at the same time.

7. A cleaning machine, as claimed in claim 6, wherein:
   said burnishing assembly is pivotal relative to said housing assembly.

8. A cleaning machine, as claimed in claim 6, wherein:
   said battery assembly includes a battery pack and a battery support assembly that supports said battery pack and in which said battery support assembly and said battery pack are movable to be contained within said battery storage assembly and removed therefrom.

9. A cleaning machine, as claimed in claim 6, wherein:
   said battery assembly includes a battery pack that provides at least 140 amperes of electrical current during steady state cleaning operations when powering the cleaning machine including all of said sweeping, scrubbing and burnishing assemblies.

10. A cleaning machine, as claimed in claim 6, wherein:
    said burnishing assembly is located on one side of said panel and said scrubbing assembly is located on an opposite side of said panel.

11. A cleaning machine, as claimed in claim 6, wherein:
    said housing assembly has a first end and a second end and with a length of said housing assembly defined therebetween, at least substantial portions of said burnishing assembly being located outwardly of said length of said housing assembly.

12. A cleaning machine, as claimed in claim 6, wherein:
    said panel is moveable.

13. A method for providing power to a cleaning machine supported on a floor surface having a number of cleaning assemblies, comprising:
    performing a number of cleaning operations simultaneously using a number of cleaning assemblies that are powered by a first battery pack, which is supported using a first battery support assembly, held in a battery storage assembly of a housing of said cleaning machine;
    replacing said first battery pack and said first battery support assembly with a second battery pack and a second battery support assembly having a front end and a rear end, said second battery support assembly including at least a first front wheel located more adjacent to said front end than to said rear end and at least a first rear wheel located more adjacent to said rear end than said front end and in which said replacing step includes entering said housing by said second battery support assembly while at least said first rear wheel contacts and moves along the floor surface that supports said cleaning machine; and conducting a number of cleaning operations using said number of cleaning assemblies all being powered by said second battery pack.

14. A method, as claimed in claim 13, wherein:

said number of cleaning assemblies include a sweeping assembly, a scrubbing assembly and a burnishing assembly.

15. A method, as claimed in claim 14, wherein:

said conducting step, includes drawing at least 140 amperes of electrical current during steady state cleaning operations when powering said cleaning machine including all of said number of cleaning assemblies.

16. A method, as claimed in claim 13, wherein:

said replacing step includes moving one of said cleaning assemblies.

17. A method, as claimed in claim 13, wherein:

said replacing step includes using wheels of said first battery support assembly to move said first battery support assembly and said first battery pack away from said battery storage assembly.

18. A method, as claimed in claim 17, wherein:

said step of using includes engaging said wheels with ramp members of said battery storage assembly.

19. A method, as claimed in claim 13, wherein:

said housing has at least a first end and said replacing step includes entering said housing first end by said second battery support assembly.

20. A method for providing power to a cleaning machine having a number of cleaning assemblies, comprising:

providing a number of cleaning operations simultaneously using a number of cleaning assemblies that are powered by a first battery pack, which is supported using a first battery support assembly held in a battery storage assembly of a housing of said cleaning machine;

replacing said first battery pack and said first battery support assembly with a second battery back and a second battery support assembly, one of said cleaning assemblies includes a burnishing assembly and said replacing step includes pivoting said burnishing assembly relative to said housing; and conducting a number of cleaning operations using said number of cleaning assemblies all being powered by said second battery pack.

21. A method for providing power to a cleaning machine having a number of cleaning assemblies, comprising:

performing a number of cleaning operations simultaneously using a number of cleaning assemblies that are powered by a first battery pack, which is supported using a first battery support assembly, held in a battery storage assembly of a housing of said cleaning machine;

replacing said first battery pack and said first battery support assembly with a second battery pack and a second battery support assembly, said replacing step including removing a squeegee assembly that is located adjacent to a rear of said housing; and conducting a number of cleaning operations using said number of cleaning assemblies all being powered by said second battery pack.

22. A cleaning machine, comprising:

a housing having a front end and a rear end;

a sweeping assembly located closer to said front end than to said rear end;

a scrubbing assembly located closer to said sweeping assembly than to said front end;

a squeegee assembly; and a burnishing assembly that is located on one side of said squeegee assembly and with said scrubbing assembly being located on an opposite side of said squeegee assembly;

wherein each of said sweeping assembly, said scrubbing assembly and said burnishing assembly is being powered at the same time.

23. A cleaning machine, as claimed in claim 22, wherein:

at least one of said sweeping assembly, said scrubbing assembly, and said burnishing assembly is powered using battery power.

24. A cleaning machine, as claimed in claim 22, wherein:

at least a first wheel is located closer to said front end than to said rear end and said sweeping assembly is the only sweeping assembly and all portions thereof are located on one side of said first wheel.

25. A cleaning machine, as claimed in claim 24, wherein:

said front end is located closer to said first wheel than to said sweeping assembly.

26. A cleaning machine, as claimed in claim 22, wherein:

at least substantial portions of said burnishing assembly are located outwardly of said housing.

* * * * *